July 27, 1926.
J. R. MILLWARD
RAIL JOINT
Filed Nov. 26, 1924
1,594,181
2 Sheets-Sheet 1
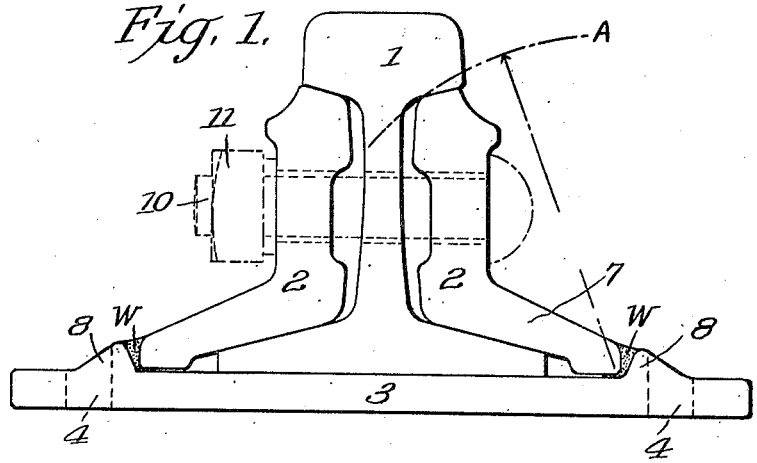
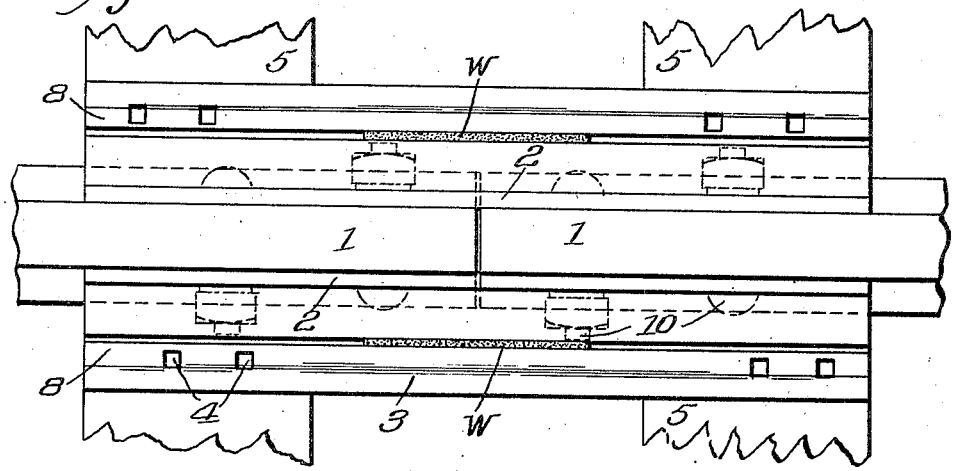
Inventor

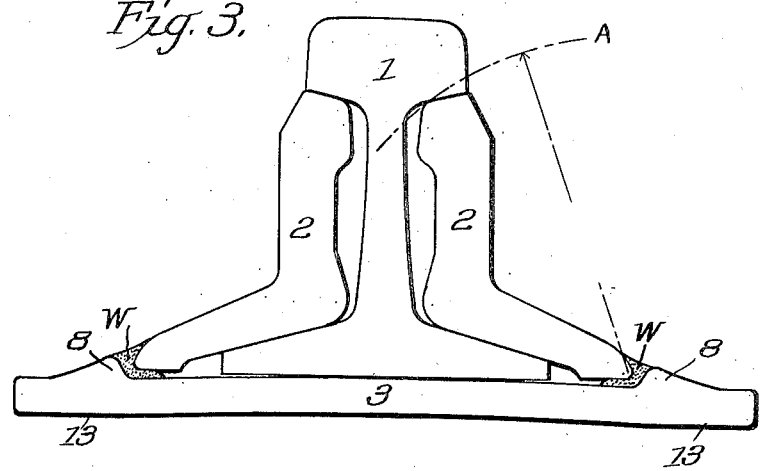
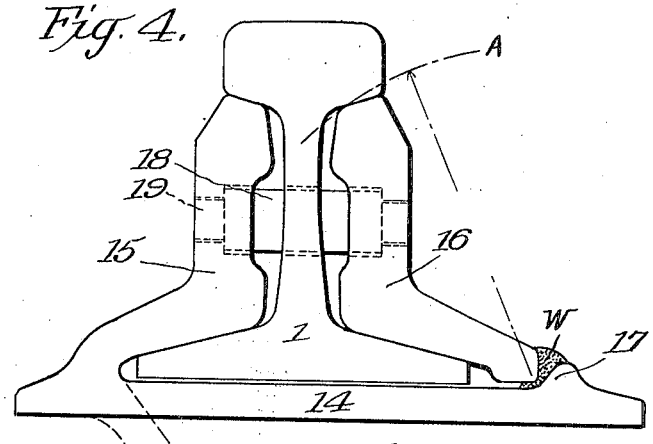
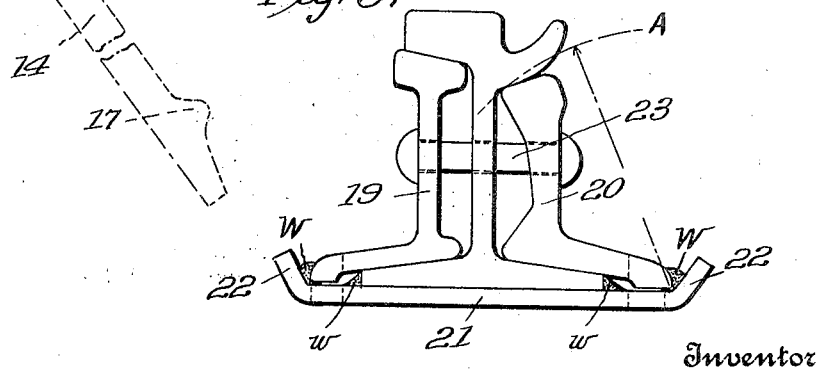

Patented July 27, 1926.

1,594,181

UNITED STATES PATENT OFFICE.

JOHN ROSCOE MILLWARD, OF TENAFLY, NEW JERSEY.

RAIL JOINT.

Application filed November 26, 1924. Serial No. 752,305.

This invention relates to rail joints and consists of an improved welded joint structure and method of weldingly securing the splice bars in a rail joint, designed to produce a joint possessing many advantages over the type of joints at present used.

An important object accomplished by the present invention is the securing of the joint or splice bar structure to be fully effective, irrespective of the bolts and without welding to the rails. This result is preferably accomplished by the employment of standard rolled angle splice bars in association with the rolled and substantially flat double shouldered joint or bridge plate with the outer edges of the splice bar flanges secured by welding to the joint plate and wherein the correlation of the engaging surfaces between the rail heads and the heads of the angle bars is such that the latter are secured from lateral displacement upon securing the flanges of the splice bars as referred to. The over-lying or securing engagement I have observed to be present in many forms of standard rolled splice bars, under the condition of the lower edge or toe of the flange being rigidly secured and this condition, in the present invention, is availed of for effectively securing the splice bars by means of a single weld, whereby the splice bars are permanently secured without welding connection to the rail and with the minimum welding requirement. Further important advantages obtained in my improved structure are that by reason of the welding connection between the splice bars and base plate, the bars and plate are united to act as a beam, or girder, both transversely and vertically in resisting the pressures. The improved structure is further designed whereby, under the action of the vertical load pressures, the upper portions of the angle bars will tend to move inwardly and, in consequence, tighten under load and to compensate for wear.

Other and important features and advantages of my present invention will be more fully understood by reference to the accompanying drawings, wherein like reference characters are employed to denote the corresponding parts in the several views.

In the drawings:—

Fig. 1 is a view in end elevation showing a rail joint embodying the features of my invention.

Fig. 2 is a plan view, thereof.

Fig. 3 is a view in end elevation showing a desirable modification employing a joint plate chambered in its transverse section.

Fig. 4 is a view, similar to Fig. 3, illustrating a further modification wherein the base plate is formed integrally with one of the angle bar sections.

Fig. 5 illustrates in end elevation, a further modification particularly adapted for street railway use.

In the approved embodiment of the features of my invention, as illustrated in Figures 1 and 2, 1—1 indicates the aligned or meeting rail ends to be joined, 2—2, the oppositely positioned splice bars and 3, the joint or base plate provided with spike apertures for receiving the usual spikes and securing it to the ties, 5. These splice bars, 2, are shown of the angle bar type with their base flanges, 7, having their lower edges, or surfaces, in close proximity to the upper surface of the base or joint plate, 3. The base plate, 3, may, desirably, be of a rolled section, substantially flat, and having adjacent the side edges thereof and upon its upper surface longitudinally extending ribs or shoulders, 8, having their inner surfaces in close proximity and in opposed relation to the outer edge surfaces of the angle bar flanges. The base plate may be of a suitable length and desirably may bridge the joint ties, as illustrated in Fig. 2.

The usual bolts, 10, are employed and function principally, to longitudinally couple the rail ends, as will be hereinafter understood.

In accordance with the present invention, the securing of the splice bars against lateral pressures and lateral displacement is effected by the joining or uniting of the lower or outer edges of the splice bar flanges with the joint plate and the longitudinal shoulders, 8, thereof, by means of the welds indicated at (W), and positioned, preferably centrally of the splice bar structure considered longitudinally and extending lengthwise a portion of the length of the plate and for a distance, say, approximately, 10 or 12 inches. The splice bars and joint plate are, accordingly, united to act together, structurally, as a beam or girder immediately at the region of the joint or rail ends and to be non-welded for a substantial length at each end portion thereof, thereby to allow for the desired rail wave movement by the independent and relative flexing of the plate and bars. The provision of the shoulders, 8, and the welding of the splice bar flanges thereto, is particularly desirable in that the shoulders function to back up or reinforce the welds to relieve them of shearing stresses and further facilitate obtaining a weld of substantial cross-sectional area.

The welding of the splice bar flanges to the joint plate, as shown, not only unites the bars and plate for obtaining increased strength and uniform distribution of the stresses at the region of the joint, but further acts to rigidly and permanently secure the splice bars against lateral displacement and in effective position. In this connection, it will be noted that the arc (A), described from the toe of the splice bar, indicates that the heads of the splice bars are secured from lateral displacement by reason of their fishing engagement, whereby they will be secured by the welds to be fully effective, irrespective of the tightness of the bolts. The latter are, accordingly, required only for longitudinally connecting the rail ends and loosening of the bolts by reason of stretching loosened nuts or wear, will not affect the efficiency of the joint structure.

The uniting of the splice bar flanges and base plate in the manner indicated, is further advantageous in that the vertical load and deflection of plate 3, under load, will tend to move the upper portions of the splice bars inwardly into close contact with the rail heads, thereby insuring alignment of the latter and contributing to the efficiency of the joint. The deflection of the joint plate in a vertical transverse plane is further instrumental in relieving the weld connection of excessive load strain and, in consequence, the stresses resisted by the weld are mainly, longitudinal and in tension. Employment of the joint plate, 3, in the manner indicated, in addition to furnishing, an inherent lateral strength to the splice bar structure, operating to reduce the transmission of the lateral stresses to the ties and fastenings, is further desirable in that such stresses as are transmitted are resisted by the spikes on each side of the rail acting together. The improved structure, as described, allows for conveniently replacing a rail by removing the bolts and sliding the splice bar structure longitudinally on to one rail or the other and there is, accordingly, produced a welded joint fully adapted for open track use, in that removal of a rail is facilitated and longitudinal expansion and contraction of the rails allowed in the usual manner.

While I have described a desirable embodiment of features of my invention, it will be understood that the same is subject to various modifications without departing from the scope thereof, as defined in the appended claims.

As illustrative thereof, I have shown in Fig. 3, a desirable modification wherein the joint plate, 3, has its central portion in transverse section of cambered contour with flattened outer edge portions, 13, thereby to accentuate the inward movement of the splice bar heads under the load stresses and to compensate for wear of the engaging surfaces.

In Fig. 4, is shown a further modification wherein the base plate, 14, is rolled integrally with an angle splice bar, 15, formed to engage the fishing angles of the rail and is connected by a single weld (W) to the flange of the opposite angle bar, 16. In manufacture, the angle bar and plate may be rolled as indicated in dotted lines and the plate, subsequently, turned up to horizontal position, the plate being rolled with the welding shoulder, 17, as shown. As shown, the parts may be proportioned to leave a small space for clearance between the bottom surface of the rail base and the top surface of the plate, 14, thereby to relieve the base plate of the direct load pressure. In this structure, in place of employing the usual bolts, I have illustrated connecting studs, 18, having an inner enlarged diameter fitting suitable apertures in the rail and splice bars and having outer portions of reduced diameter, 19, fitting smaller apertures in the outer portions of the splice bars, thereby providing connecting members for the rail ends adapted to be permanently secured in position upon the assembling of the splice bars.

In Fig. 5, there is shown a further modification and application of the features of my invention, to electrically bonded girder rails for street railways. In this structure the splice bars of the angle type are indicated at 19—20, and are welded by the welds (W) to a base plate, 21, having its end portions, 22, upturned to provide the welding shoulders. The splice bars are un-welded at their upper portion and are secured by the usual rivets, 23, and each of the rail ends may, desirably, have its base flange secured by welds (W) to the plate, 21, for electric bonding.

By the present invention, there is produced a rail joint structure which may be made up of standard rolled sections, wherein the bars and plate are united at the region of the joint to act together as a girder in resisting both lateral and vertical pressures and thereby possessing adequate strength where most needed and wherein, by reason of the comparatively short length of weld employed, interference to normal wave motion is reduced to the minimum owing to the maximum rigidity being confined to the region immediately at the meeting of the rail ends and possessing many other advantages, including permanent securing of the splice bars to be fully effective independently of the bolts. An additional advantage offered by the present improvements is that it facilitates the building up of angle bar joints now in use at small added expense and by the employment of a short length base plate of the type indicated the result may be accomplished without interfering with the ties and ballast.

Having described my invention, I claim:—

1. A rail joint structure comprising the rails, oppositely positioned splice bars connecting the rail ends, said splice bars being of standard angle type having flanges projecting outwardly beyond the rail base flange, a base plate underlying the splice bars and connecting welds between the splice bar flanges and the base plate and said rails being free of welding connection.

2. A rail joint structure comprising the rails, oppositely positioned splice bars connecting the rail ends and a base plate underlying the splice bars, said base plate being provided with shoulders laterally opposed to the lower edges of the splice bars and connecting welds between the splice bars and said shoulders and said rails being free of welding connection.

3. A rail joint structure comprising the rails, oppositely positioned splice bars connecting the rail ends and a base plate underlying the splice bars, said base plate being provided with a shoulder and means for securing the splice bars comprising a connecting weld between the splice bar and the plate shoulder and said rails being free of welding connection.

4. A rail joint structure comprising the rails, oppositely positioned splice bars connecting the rail ends and a base plate underlying the splice bars, said base plate being provided with longitudinally extending shoulders positioned laterally to oppose the splice bar flanges and connecting welds between the splice bar flanges and said shoulders and said rails being free of welding connection.

5. A rail joint structure comprising the rails, oppositely positioned splice bars connecting the rail ends, said splice bars being of angle type, having flanges extending outwardly beyond the rail base flange, a base plate underlying the splice bars and connecting welds between the splice bar flanges and said base plate, said welds being positioned at the region of the meeting rail ends and of relatively short length, substantially as described.

6. A rail joint structure comprising the rails, oppositely positioned splice bars having fishing engagement with the rail ends and a joint plate underlying the splice bars, said plate being provided with shoulders laterally opposed to the lower portions of the splice bars and a connecting weld between the splice bars and the shoulders, said weld being positioned at the region of the meeting rail ends and of relatively short length, substantially as described.

7. A rail joint structure comprising the rails oppositely positioned splice bars connecting the rail ends and a base plate underlying the splice bars, said base plate being provided with shoulders laterally opposed to the lower edges of the splice bars, connecting welds between the splice bars and said shoulders and said plate being upwardly curved in its transverse cross section and said rails being free of welding connection.

8. A rail joint structure comprising the rails, oppositely positioned splice bars connecting the rail ends and a base plate underlying the splice bars, said base plate being substantially flat and having shoulders laterally opposed to the lower edges of the splice bars and connecting welds between the splice bars and said shoulders, said welds being positioned at the region of the meeting rail ends and of a length less than normal tie spacing and said rails being free of welding connection.

Signed at New York city in the county of New York and State of New York this 25th day of November A. D. 1924.

JOHN ROSCOE MILLWARD.